Patented Aug. 19, 1952

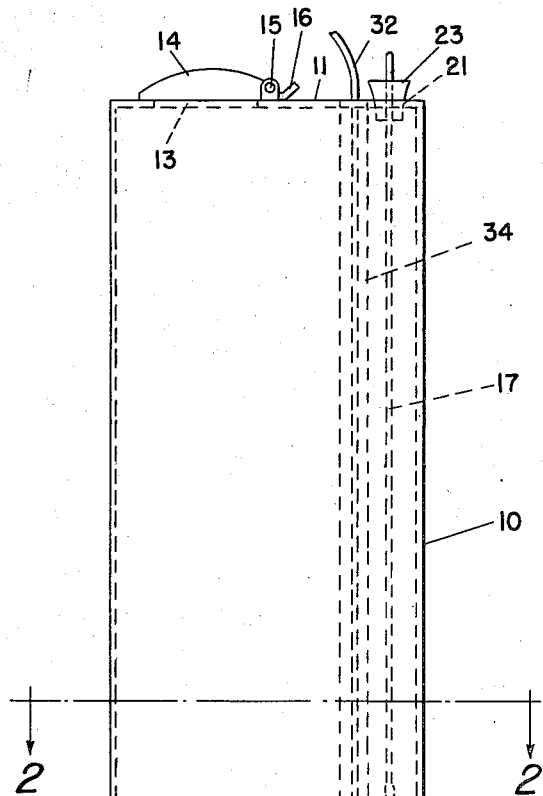
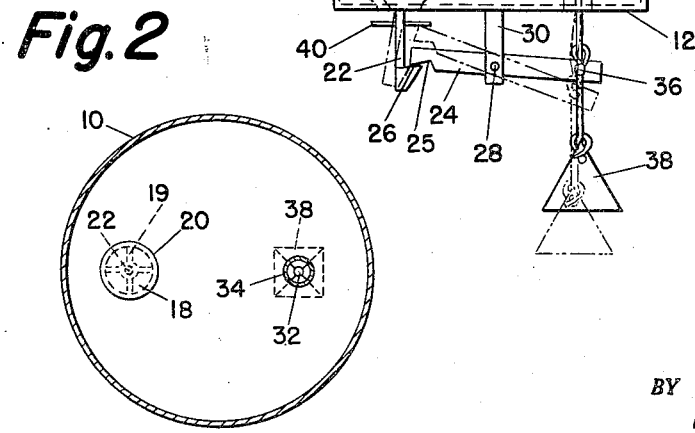
*Fig.1*
*Fig.2*
INVENTOR.
HAROLD A. QUIST
BY Busser and Harding
ATTORNEYS

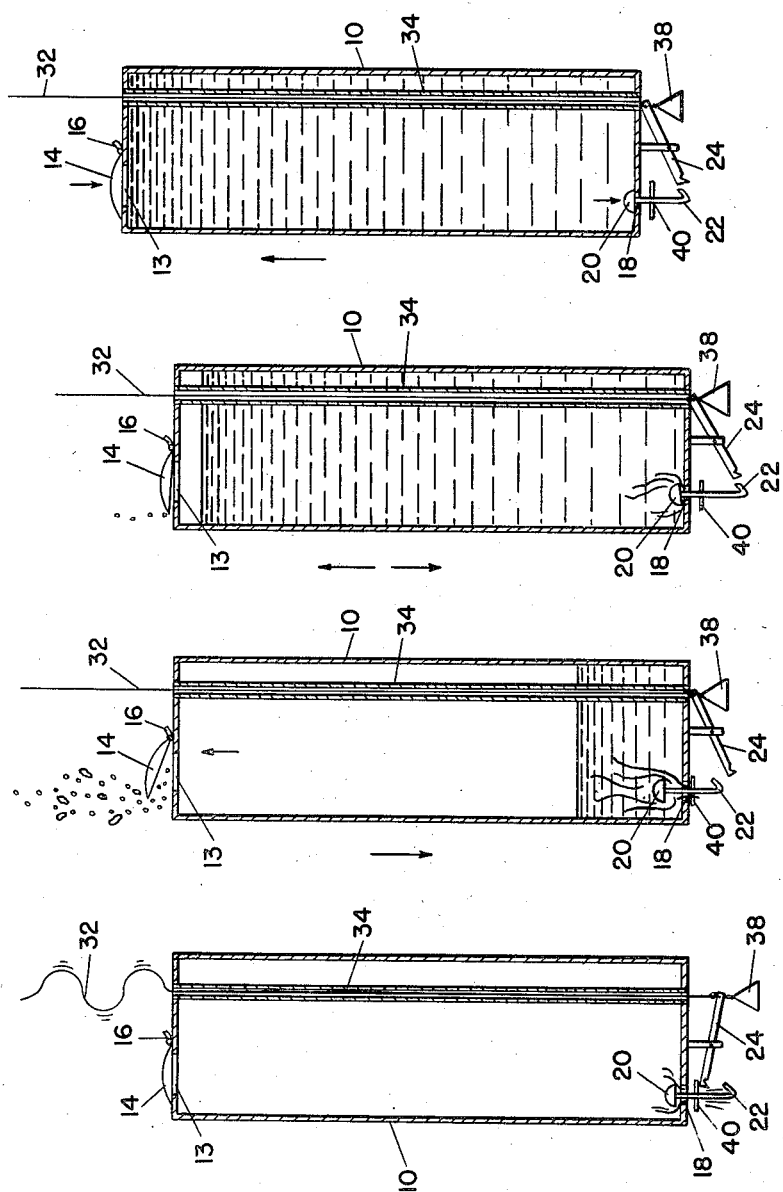

2,607,229

UNITED STATES PATENT OFFICE 2,607,229

LIQUID SAMPLER

Harold A. Quist, Elkton, Md., assignor to Sun Oil Company, Philadelphia, Pa., a corporation of New Jersey Application December 30, 1949, Serial No. 136,019

4 Claims. (Cl. 73—425.4)

This invention relates generally to devices adapted to be lowered into a body of liquid for the purpose of taking liquid samples at selected depths. Such devices have many useful applications as, for example, in the petroleum and chemical industries for the taking of samples of oil or other liquid from storage tanks, tank cars, or other containers. In the petroleum industry such devices are frequently referred to as sampling bombs or, when equipped with temperature indicating means as shown here, they are frequently referred to as temperature thieves.

The problem of obtaining samples at predetermined levels in a body of liquid for test and measurement purposes has been approached in many ways. The sampling device, usually in the form of a cup or hollow rod, has been modified by various mechanical and manually operated valve structures. The hollow rod type is limited to shallow tanks or barrels and cannot be used for great depths as required by the petroleum and chemical industries. The simplest of the cup devices is a receptacle which has no valve closure but depends upon a "washing" action caused by raising and lowering the cup at the desired level in hopes of obtaining a true sample at that strata. It is common practice to fasten a thermometer in these receptacles to obtain a temperature reading. Improvements have been made to include valve mechanisms which remain open until the proper level is reached, the liquid passing freely through the sampling vessel until a release closes the valve capturing a sample supposedly restricted to the liquid at the desired level. More complicated valve arrangements have been suggested which require separate operating lines in addition to the normal suspension line and some involve springs and weights which open and close the receptacle on proper excitation. It is the purpose of this specification to disclose a valved liquid sampler which is simple in structure and operation, requiring a single suspending and activating line, and the valved closures are operated by the liquid to be sampled. In addition, the interior of the device disclosed is kept free of liquid until the desired sampling level is reached where it is filled at that strata and refuses further addition of liquid as it is withdrawn from the body of the stored liquid.

The device broadly includes a closed receptacle which is apertured at the top and bottom. A valve member cooperating with the bottom aperture is held in closed position while the receptacle is lowered into a liquid body. A hinged cover keeps the liquid from entering the aperture in the top of the vessel and acts as an air escape during the submerged operation. A single line suspends the device and actuates the lower valve at the predetermined elevation.

Figure 1 is an elevation of the device.

Figure 2 is a cross-section on line 2—2 of Figure 1.

Figures 3A, B, C and D show several stages in the operation of the device.

Referring now to the various figures of the drawing wherein like numerals of reference designate similar parts in each of the figures, the numeral 10 designates a substantially cylindrical vessel enclosed by the top 11 and the bottom 12. An aperture 13 is shown in the top of the vessel covered by a flap 14 held externally in registry with the aperture 13 by the hinge 15. An angled extension 16 of the flap 14 projects beyond the hinge and limits the extent of the upward movement relative to the receptacle. A thermometer 17, which may be used or omitted as desired depending on the purpose the device is required to serve, is shown inserted through an opening 21 in the top 11, secured by the stopper 23.

An aperture 18 is shown in the bottom of the receptacle through which valve member 20 acts as a closure from the inside of the receptacle 10. A flexible valve rod 22 is attached to the valve member 20 and extends through the aperture 18, terminating in a hook 26 on the end. A pin 40 is fastened to the valve rod 22 as a stop to control upward movement. The spider 19, shown in elevation in Figure 2, fits into the aperture 18 leaving a substantial opening, and guides the valve rod 22 in opening and closing the aperture. The trigger arm 24 is mounted on the bottom of receptacle 10 by a pivotal connection 28 and a bracket 30, and is notched at 25 to releasably engage the hooked end 26 of the valve rod. The trigger mechanism, including the trigger arm 24, the pivot 28 and the bracket 30 is operably connected to the lowering or operating line 32 which passes downwardly through the receptacle in a stabilizing tube 34 and fastens to the end of trigger arm 24 opposite to the hook engaging end, at 36. A weight 38 is suspended from the operating line and trigger arm union 36 and will be referred to later as part of the operating mechanism.

In describing the operation of the device, reference will be made generally to Figures 1 and 2 and more particularly to Figures 3A, B, C and D in which the thermometer has been omitted for clarity. The device is lowered into the body of the liquid from which the sample is to be taken.

It is lowered slowly to prevent the hinged cover or flap 14 mounted on the top of the receptacle 10 in registry with the upper aperture 13 from being opened by the liquid. The upper surface of the flap 14 is curved, as shown, to further resist the opening tendency during the lowering of the device. In Figure 3A the receptacle is shown after it has been lowered to the desired depth in the liquid. The suspending line, passing downwardly through the receptacle in the stabilizing tube 34, connects with the trigger arm 24 as described. The stabilizing tube 34 is sealed at the top and bottom of the receptacle to prevent the entrance of liquid into the interior of the receptacle except through the valved opening in the bottom. It is desirable to locate the tube 34 as near the longitudinal axis of the receptacle as possible without interfering with the apertured closures, as its purpose is to assist in keeping the device upright in the liquid body.

An additional means for keeping the receptacle substantially upright is the weight 38. It acts, further, as the means for moving the trigger arm 24 to release the spring valve rod 22 as shown in Figure 3A when the suspending or operating line 32 is slackened by rapid, short up and down movement. The concentration of the weight into a body smaller in area than the bottom surface of the receptacle moves the trigger arm downward to the releasing position against the natural buoyancy of the receptacle. After the spring valve rod 22 disengages from the trigger arm 24 by springing away from the contact, the valve head 20 is forced upwardly by the liquid pressure until stopped by the pin 40 coming into contact with the spider 19 which centers the valve in operating position, as shown in Figure 3B. The flap cover 14 is held tightly closed by the liquid pressure outside the receptacle. The incoming liquid, urged into the receptacle through the lower aperture 18 by hydrostatic pressure, compresses the air in the receptacle to establish an equilibrium. Due to the length of the receptacle, however, the flap cover 14 is at a hydrostatic pressure less than that at the lower valve level and an equilibrium of pressures is prevented by the air escaping through the upper aperture 13 by forcing the flap cover upward. The angled extension 16 of the flap 14 keeps the flap from moving beyond the vertical and in position to re-cover the aperture 13.

The receptacle 10 is then held stationary at the desired elevation as it fills with liquid from the selected strata of the liquid. The pressure differential of the hydrostatic head between the top and bottom of the receptacle is sufficient to force the liquid in at the bottom valve opening and to release the trapped air from the upper aperture. This is readily understood if a receptacle 18 inches long is taken as an example. The pressure difference between the top and bottom will approximate one-half pound per square inch. The receptacle, after filling, is moved smoothly up and down to wash the liquid through the device to remove possible air bubbles, and to insure bringing the receptable to the temperature of the liquid at that level when temperature is to be measured, as shown in Figure 3C. This is accomplished in a few movements and the device is then ready to be pulled out of the liquid. The removal of the receptacle from the body of the liquid may be made rapidly as the change in the external liquid pressure on valve 20 and the weight of the liquid inside the receptacle will keep this valve closed. The upward movement of the device closes and holds the flap 14 over the top aperture 13, as a result of the velocity pressure, preventing liquid from strata other than that selected from entering the receptacle. The sample thus taken from the liquid body is that desired only and, as it is removed comparatively rapidly, retains the characteristics of the liquid at the desired level.

It will be recognized that a cylindrical shape for the receptacle is not necessary and that it may be any desired shape providing the valve mechanisms in the top and bottom are retained. It may be mentioned further that the type of material from which the device is made is not of great importance but is preferably of metal to add weight and to withstand pressures.

I claim:

1. A liquid sampling device comprising a closed receptacle having an aperture in the top and bottom thereof; a flap closure externally hinged to the top of said receptacle in registry with the aperture therein and restricted to limited opening movement; a stabilizing tube extending longitudinally through said receptacle in sealed connection with the top and bottom thereof; valve means arranged to cooperate with the bottom aperture of said receptacle and control the flow of liquid therethrough; a trigger rod positioned on the bottom of said receptacle adapted to releasably engage said valve means; an operating line to suspend said receptacle, attached to the trigger rod and passed upward through the stabilizing tube; and a weight depending from said line to submerge the receptacle and operate the trigger rod.

2. A liquid sampling device comprising a closed receptacle having an upper and a lower aperture therein, a stabilizing tube extending longitudinally through said receptacle in sealed connection with the top and bottom thereof, an operating line passing through said tube, a valve member inside the receptacle arranged to peripherally engage the lower aperture thereof, a flexible valve rod operably engaging said valve member and extending through said lower aperture, a trigger mechanism pivotally suspended from the bottom of said receptacle in releasing engagement with the flexible valve rod and fastened to said operating line, and a flap closure hinge connected to the top of the receptacle and registered with the upper opening externally of said receptacle.

3. A liquid sampling device comprising a receptacle having upper and lower apertures therein, a cover hinged externally of the receptacle registered with the upper aperture and restricted to limited upward movement, a valve member internally of said receptacle and cooperatively positioned in the lower aperture thereof, a spring valve rod in operable engagement with and extending downwardly from said valve member through the lower aperture of the receptacle, a trigger member pivotally mounted externally of the receptacle and adapted to releasably engage the spring valve rod, a lowering line operably engaging the trigger member and a weight depending from said trigger member.

4. A liquid sampling device comprising a closed receptacle having an aperture in the top and bottom thereof, a hinged closure externally mounted on said receptacle in registry with the top aperture, a valve member positioned in the bottom aperture and adapted to control the flow of liquid therethrough, a flexible valve rod operably engaging said valve member and extending through said bottom aperture, a trigger mechanism releasably engaging said flexible valve rod and a lowering line to suspend said receptacle operably connected to said trigger mechanism.

HAROLD A. QUIST.

REFERENCES CITED

The following references are of record in the file of this patent:

UNITED STATES PATENTS

| Number | Name | Date |
| --- | --- | --- |
| 38,427 | Tagliabue | May 5, 1863 |
| 191,302 | Birge | May 29, 1877 |
| 1,296,794 | Haggstrom | Mar. 11, 1919 |
| 2,059,999 | Rainville | Nov. 3, 1936 |
| 2,388,548 | Jurs, Jr. | Nov. 6, 1945 |
| 2,436,737 | White et al. | Feb. 24, 1948 |